United States Patent [19]

Bäro et al.

[11] Patent Number: 4,683,107
[45] Date of Patent: Jul. 28, 1987

[54] METHOD AND DEVICE FOR REPLACING NEUTRON ABSORBER RODS

[75] Inventors: Günter Bäro, Weinheim; Werner Kraus; Wilfried Stindt, both of Mannheim, all of Fed. Rep. of Germany

[73] Assignee: Brown Boveri Reaktor GmbH, Mannheim, Fed. Rep. of Germany

[21] Appl. No.: 660,895

[22] Filed: Oct. 15, 1984

[30] Foreign Application Priority Data

Oct. 15, 1983 [DE] Fed. Rep. of Germany ....... 3337636

[51] Int. Cl.[4] .............................................. G21C 19/02
[52] U.S. Cl. .................. 376/260; 29/400 N; 29/723; 376/235; 376/239
[58] Field of Search ............... 376/260, 262, 272, 235, 376/239; 29/400 N, 426.1, 426.3, 559, 723

[56] References Cited

U.S. PATENT DOCUMENTS

| | | | |
|---|---|---|---|
| 3,733,250 | 5/1973 | Van Santen | 376/264 |
| 4,223,575 | 9/1980 | Krueger | 376/260 |
| 4,243,484 | 1/1981 | Tsuji | 376/260 |
| 4,406,856 | 9/1983 | Wilkins | 376/260 |

Primary Examiner—Gene P. Crosby
Attorney, Agent, or Firm—Herbert L. Lerner; Laurence A. Greenberg

[57] ABSTRACT

Neutron absorber rods are mounted with their upper ends in bores formed in a mounting device and the absorber rods are movable within guide tubes of a nuclear reactor fuel assembly. A holding device is firmly attached to a fixed location of the storage pit. The holding device has holder tubes for absorber rods. In order to replace the absorber rods, the mounting device with the neutron absorber rods is placed and locked in the holding device, the mounting device is disconnected from at least one neutron absorber rod to be replaced, the mounting device with any neutron absorber rods still attached to it is removed from the holding device, the disconnected neutron absorber rods remaining in holder tubes of the holding device are removed for storage, new neutron absorber rods are placed in the empty holder tubes and the mounting device with any neutron absorber rods still connected to it are placed in the holding device and the mounting device is connected to the new neutron absorber rods. A device is also provided to carry out the method.

8 Claims, 5 Drawing Figures

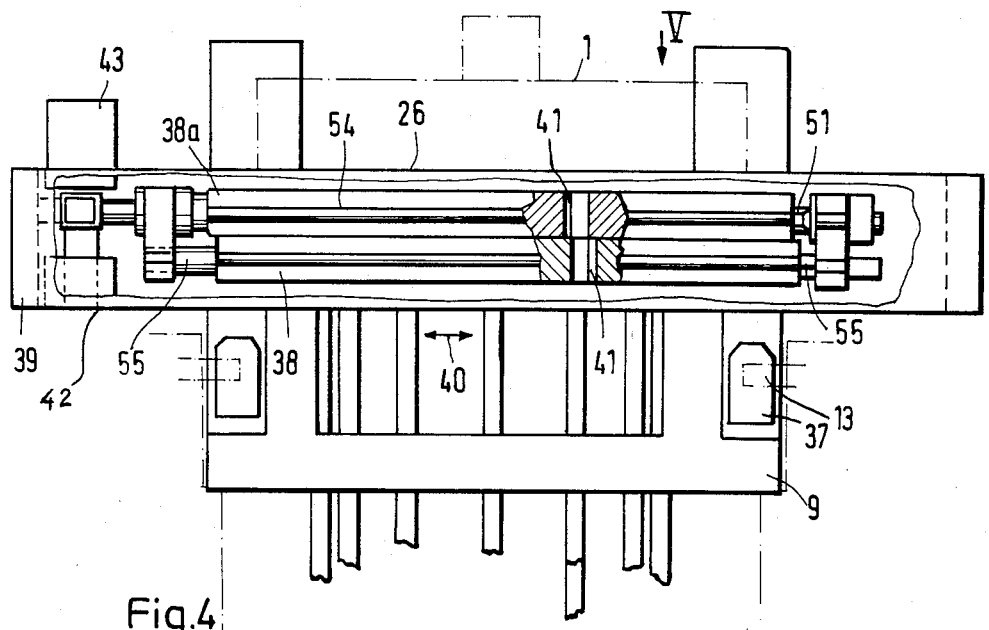
Fig.4
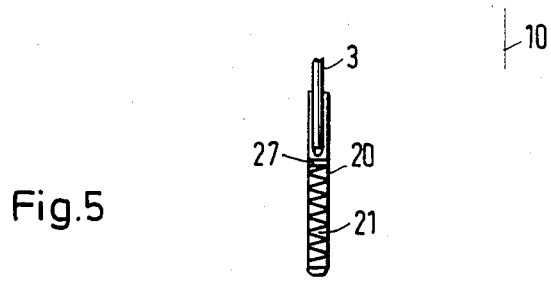
Fig.5
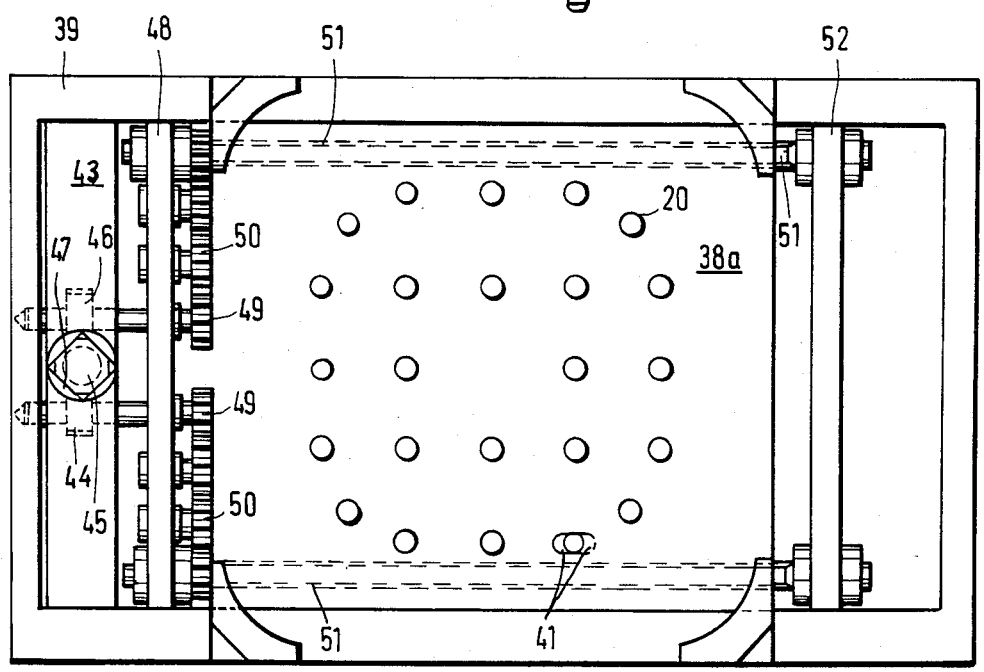

METHOD AND DEVICE FOR REPLACING NEUTRON ABSORBER RODS

The invention relates to a method and device for replacing neutron absorber rods, the upper end of each of the rods being mounted in a bore formed in a mounting device, and the rods being movable within guide tubes of a nuclear reactor fuel assembly.

The March 1983 issue of the periodical "Atomwissenschaft", page 153, left hand column, paragraph 3.2, refers to repairing and manipulating neutron absorber rod assemblies. However, nothing is said about how these assemblies are to be manipulated. During every refueling of a pressurized water reactor of the 1300 MWe class, approximately 50 neutron absorber rod assemblies, each consisting of a mounting devide and 24 neutron absorber rods which are attached to it, are removed from the reactor. The storage of such quantities of bulky absorber rod assemblies creates considerable storage capacity problems.

It is accordingly an object of the invention to provide a method and device for replacing neutron absorber rods, which overcomes the hereinafore-mentioned disadvantages of the heretofore-known devices of this general type.

With the foregoing and other objects in view there is provided, in accordance with the invention, a method for replacing neutron absorber rods in a storage pit, the absorber rods being mounted with their upper ends in bores formed in a mounting device and the absorber rods being movable within guide tubes of a nuclear reactor fuel assembly, including a holding device firmly attached to a fixed location of the storage pit, the holding device having holder tubes for absorber rods, which comprises:

(a) placing and locking the mounting device with the neutron absorber rods in the holding device;

(b) disconnecting the mounting device from at least one neutron absorber rod to be replaced;

(c) removing the mounting device with any neutron absorber rods still attached to it from the holding device;

(d) removing the disconnected neutron absorber rods remaining in holder tubes of the holding device for storage;

(e) placing new neutron absorber rods in the empty holder tube; and (f) placing the mounting device with any neutron absorber rods still connected to it in the holding device, and connecting the mounting device to the new neutron aborber rods.

These measures will permit a multiple use of the mounting device and a compact storage of the unserviceable absorber rods. Taken together, this results in a reduction of the required storage capacity. In order to carry out the method, there is provided a device for replacing neutron absorber rods in a storage pit, to be moved within guide tubes of a nuclear reactor fuel assembly, comprising a mounting device having mounting bores formed therein for mounting upper ends of the absorber rods, a holding device firmly attached to a fixed location of the storage pit, the holding device including holder tubes each receiving a respective absorber rod, the holding device including a support pad for supporting the mounting device, and the holding device having clamping bores formed therein above the holder tubes each clamping a respective absorber rod mounted to the mounting device, and tools for detaching, fastening and manipulating the absorber rods.

In accordance with another feature of the invention, each of the clamping bores formed in the holding device has a side facing toward one of the holder tubes with a step formed thereon defining a shoulder, each of the clamping bores is tapered with increasing diameter from the shoulder to the support pad, and each clamping bore has a ring disposed between a holder tube and a step attaching the holder tube to the holding device, a set of cup springs supported on the ring and pressing against the shoulder, an annular disk disposed between the set of cup springs and the step, and a tapered clamping element pressed down in the clamping bore by the mounting device and movable in the clamping bore.

In accordance with a further feature of the invention, the mounting device has a coupling element integral therewith, and including a clamping body associated with the mounting device, the clamping body being lockable to the holding device for acting on the coupling element, and the clamping body having a tool bore formed therethrough for inserting the tools.

This construction assures a reliable clamping of the mounting device even if the weight of the support structure is insufficient for holding down the tapered clamping elements, and thus for clamping-in the neutron absorber rods.

In accordance with an added feature of the invention, the holding device includes plates disposed one above the other, the clamping elements being in the form of elongated holes formed in the plates with a given longitudinal expanse, the plates being movable relative to each other within the given longitudinal expanse.

Through the use of this structure, no additional locking device for the mounting device is needed, since it is securely held after having been placed into the holding device, the neutron absorber rods being retained in vicinity of the elongated holes.

In accordance with an additional feature of the invention, the holding device includes a frame in which the plates are guided, and a rotary drive mechanism having rotary motion converted to linear motion for shifting the plates relative to each other.

In accordance with again another feature of the invention, there is provided a fuel assembly container of a fuel assembly repair station disposed in the fuel storage pit, the holding device being supported by the fuel assembly container.

With such an arrangement, no further supporting element in the fuel storage pit is needed.

In accordance with a concomitant feature of the invention, there are provided pressure springs, each being disposed at the bottom of a respective one of the holder tubes and protruding into the interior thereof.

With the use of this construction, the absorber rod is lifted sufficiently to be grabbed by a tool, and the end of the absorber rod is disconnected from the mounting device after the absorber rod has been released from the clamping device and after the mounting device has been removed.

Other features which are considered as characteristic for the invention are set forth in the appended claims.

Although the invention is illustrated and described herein as embodied in a method and device for replacing neutron absorber rods, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 4 is a partly cross-sectional and partly elevational view of another configuration of the equipment; and FIG. 5 is an elevational view of FIG. 4, as seen in the direction of the arrow V.

Figure 1:
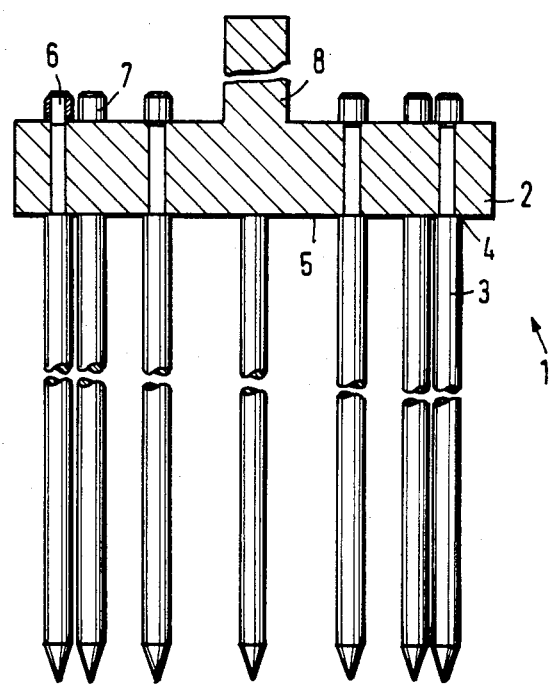
FIG. 1 is a fragmentary, diagrammatic, partly cross-sectional view of an absorber rod assembly.

Referring now to the figures of the drawings in detail and first particularly to FIG. 1 thereof, there is seen an absorber rod assembly 1 of a pressurized water reactor. The assembly is formed of a mounting device 2 to which a multiplicity of neutron absorber rods 3 are attached. Each of these rods rests with a shoulder 4 against the underside 5 of the mounting device 2 and is fitted with a thread 6 at the end thereof which passes through a mounting bore in the mounting device 2. A nut 7 which is screwed onto this thread, firmly holds the absorber rod 3 in the mounting device. The nut 7 is secured against undesired unscrewing. A coupling element 8 protrudes from the center of the mounting device 2 on the side opposite the neutron absorber rods. The coupling element can be connected to a non-illustrated drive mechanism in order to allow vertical motions of the absorber rods 3 inside the guide tubes of a fuel assembly.

Figure 3:
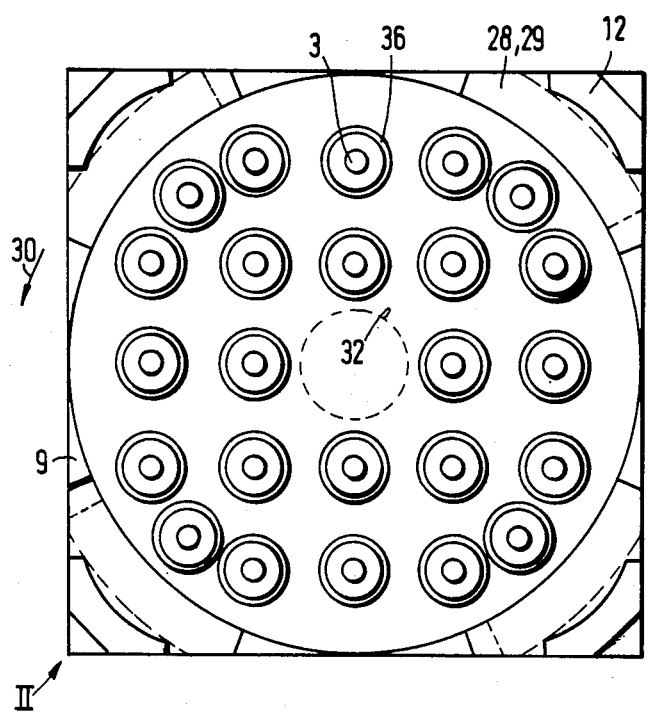
FIG. 3 is an elevational view of FIG. 2 as seen in the direction of arrow III.
Figure 2:
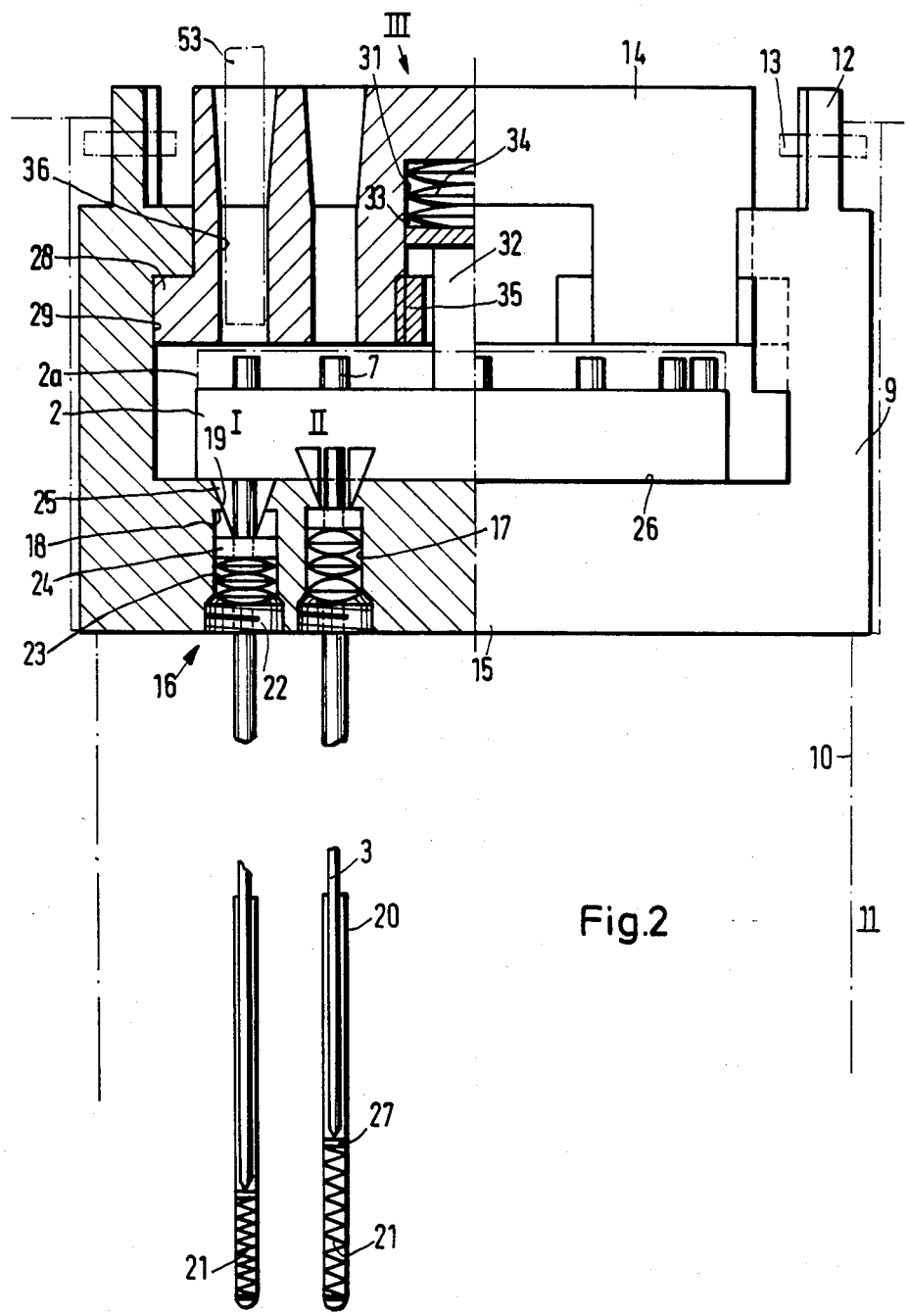
FIG. 2 is a fragmentary, partly cross-sectional and partly elevational view of a device viewed in the direction of the arrow II in FIG. 3.

A holding device 9 shown in FIGS. 2 and 3 is provided for the replacement of absorber rods 3. The external dimensions of the holding device 9 correspond to those of the upper end fitting of a fuel assembly normally used in nuclear power plants. It is therefore possible to insert and lock the holding device 9 in a container 10 which is normally used for holding complete fuel assemblies and which is part of a non-illustrated fuel assembly repair station disposed in the water 11 of a fuel storage pit. The container 10 is illustrated by dot-dash lines. The container 10 is locked by means of a catch 13 engaging a standard 12 of the holding device 9. The absorber rod assembly 1 is placed in the holding device 9 after a clamping body 14 has been removed. For this purpose, a base plate 15 of the holding device 9 is provided with the same number of penetration or through holes 16 as there are absorber rods 3 fitted to the absorber rod assembly 1. The penetration holes or clamping bores are arranged in the same geometric pattern as the absorber rods. Every penetration hole is formed as a clamping element preventing any rotation of the absorber rod 3 when the nut 7 is loosened or tightened. For this purpose, the hole 16 is shaped as a stepped bore on the side facing away from the mounting device. A tapered bore 19 extends from a shoulder 18 of a stepped bore 17 in the bore 16 to the side of the bore 16 facing the mounting device 2, the diameter of the bore 19 being largest on the side facing the mounting device 2. On the opposite side, every bore 16 is provided with a holder tube 20 for accepting the absorber rods 3 after the nut 7 has been removed. The holder tube is attached in the stepped bore 17 with a ring 22 placed inbetween. The ring 22 carries a set of cup springs 23 which can press an annular disk 24 against the shoulder 18 of the stepped bore 17. The side of the annular disk 24 which faces away from the set of cup springs 23, contacts tapered clamping elements 25 which can be shifted along the tapered bore 19.

Only two bores 16 are shown in FIG. 2 for the sake of clarity. The bore labelled with reference symbol "I" is shown in its position when the mounting device 2 is placed upon a pad 26, and the bore labelled "II" is shown in its position when the clamping body 14 has been removed, with the mounting device 2 having reached the position 2a (shown by a dot-dash line) due to the force of the sets of spring cups 23. In position "I" the clamping elements 25, acting like a collet chuck, retain the absorber rod 3 and prevent its rotation when the nut 7 is loosened or tightened. A pressure spring 21 disposed in the lower part of the holder tube 20 acts as an ejector element for an absorber rod. This pressure spring is pretensioned at the bottom of the holder tube 20 with a disk 27 disposed between an absorber rod 3 and the pressure spring 21. When the clamping body 14 is removed, the bore 16 assumes the position "II" and the mounting device 2 assumes the position 2a (dot-dash line). The pretensioned pressure spring 21 is relaxed and pushes the absorber rod 3 sufficiently upward so that it can be grabbed by a tool 53 (indicated by dot-dash lines) after the mounting device 2 has been removed.

As can be seen from FIGS. 2 and 3, the clamping body 14 has four projecting parts 28 which engage corresponding recesses 29 formed in the holding device 9, functioning like a bayonet catch. The clamping body 14 is shown in the operating position. By turning the clamping body 14, 45° in the direction of an arrow 30 shown in FIG. 3 it is unlocked and the clamping body 14 can be removed by lifting it vertically. During the downward movement of the mounting device 2 until it comes to rest on the pad 26, the clamping body 14 presses against the coupling element 8 which protrudes into a recess 31 formed in the clamping body 14. A set of cup springs 34 is disposed between a front surface 33 of a disk 32 and the clamping body 14, compensating the spring forces of all of the cup spring sets 23 of the bores 16 and the spring forces of all of the pressure springs of the holder tubes 20. A stop 35 disposed at the opening of the recess 31 prevents the disk 32 from falling out when the clamping body 14 is removed. The clamping body 14 has the same number of through bores 36 as the holding device 9 has bores 16. When the clamping body 14 is in its operating position, the penetration bores are disposed above the absorber rods 3 in such a way that the tool 53 can be inserted for loosening or tightening the nut 7. To ease the insertion of the tool, the through bores 36 of the clamping body 14 are funnel-shaped.

FIGS. 4 and 5 illustrate another configuration of the holding device with respect to the locking of the absorber rods 3. The holding device 9 is supported by the same fuel assembly container 10 as described in the embodiment of FIGS. 2 and 3. The holding device 9 is locked to the container 10 by means of catches 13 which engage recesses 37 formed in the holding device 9. The holding device 9 is formed of a frame 39 which extends upward and downward with the contour of a standard upper end fitting of a fuel assembly, so that it can be transported with an existing fuel assembly grapple tool or gripper and supported in the aforementioned container 10. Two plates 38, 38a are disposed one above the other and guided in the frame 39; they can be shifted relative to each other in the direction of the arrow 40. The two plates 38, 38a are fitted with mutually elongated holes 41 extending in the direction of the arrow 40. The holder tubes 20 are fastened to the underside 42 of the frame 39 in such a way that they can accept the absorber rods 3 of the absorber rod assembly 1 (indicated by dot-dash lines) when the elongated holes are in alignment. The pressure springs 21 disposed at the bottom of every holder tube 20 are constructed in such a way that they will have reached their pretensioned position when the mounting device 2 rests on the upper plate 38a. The upper plate 38a is moved relative to the plate 38 by means of a remotely controlled rotary drive mechanism 43. The rotary motion of the mechanism 43 is converted to a linear motion in the direction of the arrow 40. This will cause the absorber rods to be locked in at one absorber rod, as can be seen from the cut-away section of FIG. 4. Loosening or tightening of the nut 7 can now be achieved without twisting an absorber rod. After the return of the plate 38a to is initial position with the elongated holes 41 in alignment, and after the removal of the mounting device with the absorber rods still attached to it, the pressure springs 21 are relaxed and will push the disconnected absorber rods sufficiently upward beyond the support face or pad 26 of the upper plate 38a, so that the rods can be grabbed by a non-illustrated tool and taken out of the holder tube.

The rotary drive mechanism 43 for shifting the plates includes a worm 45 held in a cross piece or traverse 44; the worm 45 produces a rotary motion of two worm gear shafts. The worm gear shafts are supported in the frame 39 and a cross piece 48, and each of the shafts are fitted with a gearwheel 49 at their free ends. Each gearwheel 49 drives a recirculating ball leadscrew 51 allocated to the upper plate 38 at opposite external regions and the leadscrews are supported by the cross piece 48 and another cross piece 52. A nonillustrated leadscrew nut attached to the plate 38a is allocated to each recirculating ball leadscrew. Although the lower plate 38 is rigidly attached to the cross pieces 48, 52 by means of bolts 55, the upper plate 38a can be shifted relative to the lower plate 38 by the action of the recirculating ball leadscrew which results in the absorber rods 3 being clamped in. Grooves 54 serve to guide the plates 38, 38a with respect to the frame 39. For the sake of clarity only one elongated hole 41 is depicted in FIG. 5, and in the remaining positions only the holder tubes 20 can be seen.

The foregoing is a description corresponding in substance to German Application No. P 33 37 636.0-33, filed Oct. 15, 1983, the International priority of which is being claimed for the instant application, and which is hereby made part of this application. Any material discrepancies between the foregoing specification and the aforementioned corresponding German application are to be resolved in favor of the latter.

We claim:

1. Method for replacing neutron absorber rods in a storage pit, the absorber rods being mounted with their upper ends in bores formed in a mounting device and the absorber rods being movable within guide tubes of a nuclear reactor fuel assembly, including a holding device firmly attached to a fixed location of the storage pit, the holding device having holder tubes for absorber rods, which comprises:

(a) placing and locking the mounting device with the neutron absorber rods in the holding device;
    (b) disconnecting the mounting device from at least one neutron absorber rod to be replaced;
    (c) removing the mounting device with any neutron absorber rods still attached to it from the holding device;
    (d) removing the disconnected neutron absorber rods remaining in holder tubes of the holding device for storage;
    (e) placing new neutron absorber rods in the empty holder tubes; and
    (f) placing the mounting device with any neutron absorber rods still connected to it in the holding device, and connecting the mounting device to the new neutron absorber rods.

2. Device for replacing neutron absorber rods in a storage pit, to be moved within guide tubes of a nuclear reactor fuel assembly, comprising a mounting device having mounting bores formed therein for mounting upper ends of the absorber rods, a holding device firmly attached to a fixed location of the storage pit, said holding device including holder tubes each receiving a respective absorber rod, said holding device including a support pad for supporting said mounting device, and said holding device having clamping bores formed therein above said holder tubes each associated in clamping a respective absorber rod mounted to said mounting device, and tools for detaching, fastening and manipulating the absorber rods.

3. Device according to claim 2, wherein each of said clamping bores formed in said holding device has a side facing toward one of said holder tubes with a step formed thereon defining a shoulder, each of said clamping bores is tapered with increasing diameter from said shoulder to said support pad, and each clamping bore has a ring disposed between a holder tube and a step attaching said holder tube to said holding device, a set of cup springs supported on said ring and pressing toward said shoulder, an annular disk disposed between said set of cup springs and said step, and a tapered clamping element pressed down in said clamping bore by said mounting device and movable in said clamping bore.

4. Device according to claim 3, wherein said mounting device has a coupling element integral therewith, and including a clamping body associated with said mounting device, said clamping body being lockable to said holding device for acting on said coupling element, and said clamping body having a tool bore formed therethrough for inserting said tools.

5. Device according to claim 2, wherein said holding device includes plates disposed one above the other, clamping elements being in the form of elongated holes formed in said plates with a given longitudinal expanse, said plates being movable relative to each other within said given longitudinal expanse.

6. Device according to claim 5, wherein said holding device includes a frame in which said plates are guided, and a rotary drive mechanism having rotary motion converted to linear motion for shifting said plates relative to each other.

7. Device according to claim 2, including a fuel assembly container of a fuel assembly repair station disposed in said storage pit, said holding device being supported by said fuel assembly container.

8. Device according to claim 2, including pressure springs, each being disposed at the bottom of a respective one of said holder tubes and extending along the interior thereof.

* * * * *